United States Patent [19]
Suetterlin et al.

[11] Patent Number: 4,839,417

[45] Date of Patent: Jun. 13, 1989

[54] METHOD FOR MAKING ODORLESS AQUEOUS SOLUTIONS OF WATER SOLUBLE POLYMERS OR COPOLYMERS

[75] Inventors: Norbert Suetterlin, Mühltal-Nieder-Beerbach; Hans-Dieter Blitz, Darmstadt; Hans Trabitzsch, Seeheim-Jugenheim, all of Fed. Rep. of Germany

[73] Assignee: Röhm GmbH, Darmstadt, Fed. Rep. of Germany

[21] Appl. No.: 163,825

[22] PCT Filed: Jun. 12, 1987

[86] PCT No.: PCT/DE87/00268

§ 371 Date: Feb. 8, 1988

§ 102(e) Date: Feb. 8, 1988

[30] Foreign Application Priority Data

Jun. 14, 1986 [DE] Fed. Rep. of Germany ....... 3620149

[51] Int. Cl.$^4$ .............................................. C08L 31/00
[52] U.S. Cl. ..................................... 524/833; 524/831; 526/86; 526/93; 526/94
[58] Field of Search ............................. 526/94, 86, 93; 524/833, 831

[56] References Cited

U.S. PATENT DOCUMENTS

| | | | |
|---|---|---|---|
| 2,380,475 | 7/1945 | Stewart | 526/94 |
| 2,471,938 | 5/1949 | Crouch et al. | 526/94 |
| 3,080,347 | 3/1963 | Sandberg et al. | 260/80.5 |
| 4,095,035 | 6/1978 | Lamberti et al. | 560/180 |
| 4,282,340 | 8/1981 | Anchor et al. | 526/94 |

FOREIGN PATENT DOCUMENTS 0113048  7/1984  European Pat. Off.

*Primary Examiner*—Joseph L. Schofer
*Assistant Examiner*—N. Sarofim
*Attorney, Agent, or Firm*—Curtis, Morris & Safford

[57] ABSTRACT

Water-soluble polymers or copolymers of acrylic and/or methacrylic acid which contain at least 50 base mole percent of these acids and as end groups hydrogen atoms, hydroxyl groups and moieties of a water-soluble mercaptan or moieties with a sulfoxide group formed therefrom are produced in a readily reproducible manner and free of mercaptan odor in aqueous solution by polymerization with an initiator system consisting of hydrogen peroxide, a water-soluble mercaptan and an iron salt and used as calcium-binding additives or as dispersants in aqueous systems.

9 Claims, No Drawings

METHOD FOR MAKING ODORLESS AQUEOUS SOLUTIONS OF WATER SOLUBLE POLYMERS OR COPOLYMERS

The invention relates to water-soluble polymers and copolymers of acrylic and/or methacrylic acid of low to medium molecular weight, a process for their production, and their use in aqueous systems.

THE PRIOR ART

The polymerization of acrylic or methacrylic acid, optionally together with comonomers copolymerizable therewith, in aqueous solution to the corresponding aqueous solutions is a standard procedure. (See Houben-Weyl, Methoden der orgnischen Chemie, vol. 14/1, 1019-21.) The polymerization can be initiated at from 80° to 90° C. with potassium or ammonium persulfate or at room temperature or slightly higher temperature with redox systems such as potassium persulfate and sodium hydrosulfite.

Moreover, it is known to add water-soluble mercaptans such as thioglycolic acid as chain-transfer agents in the production of such polymers of low molecular weight.

It is difficult to produce polymers of specific molecular weight reproducibly by this process. The properties of polymers are markedly dependent on their molecular weight, and even minor fluctuations during production will therefore result in products with varying properties. To assure better reproducibility of the properties, European Pat. No. 127,388 proposes to fractionate polymers of acrylic acid obtained in aqueous solution on the basis of the molecular weight, which, however, necessitates an additional process step after polymerization.

THE OBJECT AND THE INVENTION

The invention has as its object the production of polymers of predetermined molecular weight of acrylic and/or methacrylic acid or of copolymers of these acids with other monomers copolymerizable therewith. Moreover, it is sought to avoid the unpleasant odor which polymers of low to medium molecular weight produced with mercaptans usually have.

It has been found that the polymerization of acrylic or methacrylic acid or the copolymerization of not less than 50 mole percent of acrylic and/or methacrylic acid with not more than 50 mole percent of one or more other monomers copolymerizable therewith, based in both cases on the mole total of the polymerizable monomers, in aqueous solution will yield in a readily reproducible manner a water-soluble polymer of predetermined molecular weight when the polymerization is initiated with a redox system of hydrogen peroxide, a water-soluble iron salt and a water-soluble mercaptan.

The reduced viscosity of the polymer being formed, which is a measure of the magnitude of the average molecular weight or of the degree of polymerization, has been found to be only slightly dependent, if at all, on the amount of hydrogen peroxide used, which renders the process largely insensitive to variations in the hydrogen peroxide concentration.

On the other hand, there is a definite and reproducible dependence of the reduced viscosity on the amount of the water-soluble mercaptan. This dependence extends all the way down to molecular weights of a few thousand, as is apparent from the table which follows.

Molecular weight (weight or number average) of polyacrylic acid produced in a 50% aqueous solution in the presence of from 1.5 to 7.5 wt. % hydrogen peroxide, 0.005 wt. % ferrous sulfate and from 1 to 5 wt. % mercaptoethanol (all based on acrylic acid) at an initial temperature of 20° C. All molecular weights are based on a gel permeation chromatography calibration curve constructed on the basis of the sodium salt of polyacrylic acid.

| Mercapto-ethanol | Hydrogen peroxide | Molecular Weight average | Weight Number average | Non-uniformity |
|---|---|---|---|---|
| 0.5 | 1.5 | 57,000 | 18,000 | 2.3 |
| 1 | 3.3 | 28,100 | 11,200 | 1.5 |
| 2 | 3.3 | 14,600 | 5,360 | 1.73 |
| 5 | 3.3 | 4,940 | 1,460 | 2.39 |
| 7 | 4.5 | 3,360 | 1,860 | 0.81 |
| 10 | 4.5 | 2,300 | 1,350 | 0.70 |
| 20 | 7.5 | 1,250 | 770 | 0.61 |

The relatively slight nonuniformity is an advantage that benefits the specific effectiveness.

While it is known that low-molecular-weight polymers can be produced by the use of mercaptans, the reproducibility usually is unsatisfactory, in contrast to the process of the invention, especially when large amounts of mercaptans are used. Besides, large amounts of mercaptans are avoided whenever possible because of the extremely unpleasant odor of the polymers so produced. Surprisingly, the polymers produced in accordance with the invention, or aqueous solutions thereof, are almost free of odor, which is presumably due to the oxidation of the sulfur atom of the mercaptan or of its secondary products to a sulfoxide group.

THE PRACTICE OF THE INVENTION

The polymers produced in accordance with the invention have the structure

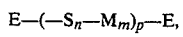

wherein

E is an end group with the structure H—, RS—, R—SO— or HO—,
R is the moiety of a water-soluble mercaptan,
S is a polymerized unit of acrylic acid or of methacrylic acid or of their monovalent salt,
M is a polymerized unit of one or various comonomers copolymerizable with acrylic acid or methacrylic acid,
p is the average total number of the units S and M,
n is the percentage of the units S in base mole percent, and
m is the percentage of the units M in base mole percent.

Here p represents the degree of polymerization which results from the average values of the number of units of acrylic or methacrylic acid (S) and optionally of the comonomers (M). The values n and m represent the total number of moles of the monomers on which the units S and M are based, which is referred to as base mole percent. The value of n ranges from 50 to 100 percent, and that of m from 0 to 50 percent. As a rule, the units S and M are randomly distributed so that the indices n and m only refer to their proportion, not to their sequence.

Through the start or termination of a polymer chain at the hydroxyl radicals formed by the decomposition of hydrogen peroxide, hydroxyl groups are formed as end groups E. Through transfer reactions at the water-soluble mercaptans, end groups E with E=H and E=RS— or, through oxidation of the sulfur atom, R—SO—, are formed. There are no other end groups.

The acid units S are preferably formed from acrylic acid. Acrylic and methacrylic acid can be polymerized individually to homopolymers, or together to a copolymer of the two acids. The same applies to the monovalent salts of these acids, that is, salts of monovalent cations, such as alkalimetal and ammonium salts. In addition to these acids or their salts, one or more other comonomers may go into the composition of the water-soluble polymers. Their proportion should be such, according to their hydrophilic or hydophobic nature, that the polymer as a whole is water-soluble.

Strongly hydrophilic comonomers, and particularly those which at room temperature form over 10 weight percent aqueous solutions, may represent up to 50 mole percent of the monomers. Such comonomers include, for example, acryl- and methacrylamide, N-methylolacrylamide and -methacrylamide, N-vinylpyrrolidone, hydroxyalkyl esters of acrylic and methacrylic acid, and particularly those having from 2 to 4 carbon atoms in the hydroxyalkyl group, as well as dialkylaminoalkyl esters and dialkylaminoalkylamides of acrylic and methacrylic acid, which usually contain from 4 to 10 carbon atoms in the dialkylaminoalkyl group.

An important group of comonomers consists of weakly hydrophilic compounds which at room temperature form from 1 to 10 percent aqueous solutions. Polymers which because of a high proportion of such comonomers are at the boundary of water solubility are particularly advantageous for various applications.

The maximum permissible proportion of these comonomers depends also on the acid and optionally further comonomers of higher hydrophilicity used. Acrylic acid can be copolymerized with a higher proportion of these monomers than methacrylic acid. Similarly, the water-soluble salts of acrylic or methacrylic acid tolerate higher proportions of these comonomers than the free acids without losing their water solubility.

For the use of the polymer as a calcium-binding agent, ethyl acrylate is the comonomer best suited. Copolymers of from 60 to 90 mole percent of acrylic acid and from 40 to 10 mole percent ethyl acrylate are distinguished by particularly high calcium-binding capacity.

Very good results are also obtained with methyl acrylate, acrylonitrile, and lower hydroxyalkyl esters of acrylic and methacrylic acid having from 2 to 4 carbon atoms in the hydroxyalkyl group. Mixtures of these comonomers are also advantageous. For other fields of application, other comonomers such as other alkyl esters of acrylic and methacrylic acid as well as methacrylonitrile are suitable.

Still more hydrophobic comonomers which at room temperature form less than 1 percent aqueous solutions will increasingly impart surfactant properties to the copolymer. This is true, for example, of the higher esters of acrylic or methacrylic acid or other unsaturated polymerizable mono- or di-carboxylic acids, with the alkyl groups containing from 4 to 18 carbon atoms, for example. The proportion of these hydrophobic comonomers usually should not exceed 20 mole percent.

The molecular weight of the polymers can be selected over a wide range by judicious adjustment of the polymerization conditions, and especially by proper choice of the amount of the water-soluble mercaptan, and reproduced with a high degree of accuracy. The weight-average molecular weight may range from 800 to 100,000. The preferred molecular-weight range is from 800 to 20,000. The nonuniformity usually is less than 3, particularly when mercaptoethanol is used, and preferably is between 0.5 and 1.5. The molecular weights are based on a gel-permeation chromatography calibration curve constructed by the use of the sodium salt of polyacrylic or polymethacrylic acid.

The polymerization process is carried out in aqueous solution, which requires that the monomer mixture as a whole be soluble in water. Acrylic or methacrylic acid then acts as a solubilizer for monomers which are insoluble or poorly soluble in water, and these may therefore be present in higher concentration than their solubility in pure water would permit. The aqueous monomer solution preferably contains from 10 to 60 weight percent of polymerizable monomers.

The initiator system is a redox system which contains hydrogen peroxide as the oxidizing component. The hydrogen peroxide also acts oxidizingly on the sulfur atoms of the mercaptan. Its concentration may range from 0.5 to 10 weight percent and preferably ranges from 1 to 8 weight percent, based on the weight of the monomers. The water-soluble mercaptan also serves as the reducing component of the redox system and as a molecular-weight regulator. Suitable for this use are mercaptoethanol, which is preferred, and thioglycolic acid, for example. Hydrogen peroxide is used in a molar ratio of about 0.1 to 10 times the amount of the mercaptan. For suppression of the mercaptan odor, it is advisable to use an equivalent or excess amount of hydrogen peroxide in relation to the mercaptan. The amount of the water-soluble mercaptan depends on the desired molecular weight. When from 0.5 to 1 weight percent is used, polymers having molecular weights ranging from 10,000 to 100,000 can be obtained. It is preferable to use from 1 to 20 weight percent of the mercaptan, which will permit polymers having molecular weights of from 800 to 10,000 to be produced.

Suitable for use as water-soluble iron salts are in particular the salts of bivalent iron, for example ferrous sulfate. The iron ion has a catalytic effect on the redox reaction, and low concentrations of from 10 to 1,000 ppm, for example, will therefore suffice. Higher concentrations can be used but may produce side reactions and discoloration.

The polymerization can be started in the temperature range from 10° to 60° C., and preferably at room temperature. The temperature will rise considerably in the course of the polymerization. The polymerization can be started by adding the components of the initiator system to the aqueous monomer solution, preferably in the sequence iron salt/hydrogen peroxide/mercaptan. If desired, the water-soluble mercaptan and the iron salt may also be dissolved earlier in the monomer solution, the hydrogen peroxide then being added by itself to initiate the polymerization. It is also possible to add further portions of the monomers and/or of the redox system or of its components during the polymerization, either uniformly or in portions, with stirring.

As a rule, the polymerization is completed after just a few minutes. A clear, viscous polymer solution is opbtained. Its viscosity will depend on the molecular weight of the polymer and on its solids content. It will be advantageous to coordinate these quantities so that the viscosity will not be greater than 100 Pa/s, and preferably not greater than 20 Pa/s.

For many purposes, the polymer solution can be used as is. However, it can also be converted conventionally, for example by drum drying or spray drying, to a powdered solid which can be again dissolved in water when required.

USES

The polymers of the invention are suitable for all purposes for which the corresponding acrylic or methacrylic polymers of low to medium molecular weight have been used up to now, over which they generally offer the advantage of greater effectiveness per unit weight.

The field of application may be described in broad terms as the dispersing of both aqueous systems with a high solids content and those with a low solids content. Included. are dispersants for mineral substances and pigments in systems with a high solids content, sedimentation retarders for clouding agents, crust inhibitors effective against calcium-carbonate and calcium-phosphate crusts, calcium-binding agents, and additives for washing and cleansing liquors, cold- and hot-water systems, and phosphate substitutes for use in detergents in amounts of from 1 to 10 weight percent. Further applications are viscosity modifiers for aqueous coating compositions, flow-control agents, and finishes and sizes for textiles.

EXAMPLE 1

To a glass vessel equipped with stirrer and thermometer, 300 g of water, 100 g of acrylic acid, 0.5 g of mercaptoethanol and 0.01 g of ferous sulfate is charged and 5 g of a 30% hydrogen peroxide solution is then added. In a short time, the temperature rises to 80°–90° C. On completion of the reaction, the charge is cooled to room temperature and another 100 g of acrylic acid and 0.5 g of mercaptoethanol are added. This second-stage polymerization is also initiated by the addition of 5 g of a 30% hydrogen peroxide solution.

A clear, approximately 40% polymer solution with a weakly acidulous odor and a viscosity of about 10,000 mPa/s is obtained. The weight-average molecular weight is 57,000, and the nonuniformity, 2.3.

EXAMPLES 2 TO 6

The same procedure is used as in Example 1, except that in place of the amounts of mercaptoethanol and hydrogen peroxide there indicated the amounts given in the table which follows are used.

The table further gives the number and weight averages of the molecular weights obtained as well as the nonuniformities resulting therefrom. The products are free of the odor of sulfur compounds.

TABLE 1

| Example | Water (g) | Monomers | Mercapto-ethanol (g) | Hydrogen peroxide solution, 30% (g) | Ferrous sulfate (g) | Solids content (%) | $M_w$ (1) | $M_n$ (2) | NU (3) |
|---|---|---|---|---|---|---|---|---|---|
| 1 | 300 | First stage: 100 g acrylic acid | 0.5 | 5.0 | 0.01 | | | | |
| | — | Second stage: 100 g acrylic acid | 0.5 | 5.0 | — | 40 | $5.7 \cdot 10^4$ | $1.8 \cdot 10^4$ | 2.3 |
| 2 | 300 | First stage: 100 g acrylic acid | 1.0 | 10.0 | 0.01 | | | | |
| | — | Second stage: 100 g acrylic acid | 1.0 | 10.0 | — | 40 | $2.8 \cdot 10^4$ | $1.1 \cdot 10^4$ | 1.5 |
| 3 | 300 | First stage: 100 g acrylic acid | 2.0 | 10.0 | 0.01 | | | | |
| | — | Second stage: 100 g acrylic acid | 2.0 | 10.0 | — | 40 | $1.46 \cdot 10^4$ | $5.4 \cdot 10^3$ | 1.7 |
| 4 | 300 | First stage: 100 g acrylic acid | 5.0 | 10.0 | 0.01 | | | | |
| | — | Second stage: 100 g acrylic acid | 5.0 | 10.0 | — | 40 | $5.0 \cdot 10^3$ | $1.5 \cdot 10^3$ | 2.4 |
| 5 | 545 | First stage: 181 g acrylic acid | 12.7 | 27.3 | 0.018 | | | | |
| | — | Second stage: 181 g acrylic acid | 12.7 | 27.3 | — | 40 | $3.3 \cdot 10^3$ | $1.86 \cdot 10^3$ | 0.81 |
| 6 | 526 | First stage: 175 g acrylic acid | 35.0 | 43.8 | 0.0175 | | | | |
| | — | Second stage: 175 g acrylic acid | 35.0 | 43.8 | — | 40 | $1.25 \cdot 10^3$ | $7.77 \cdot 10^2$ | 0.61 |

(1) $M_w$ = Weight-average molecular weight
(2) $M_n$ = Number-average molecular weight
(3) NU = Nonuniformity

EXAMPLE 7

To the apparatus described in Example 1, 545 g of water, 181 g of methacrylic acid, 12.7 g of mercaptoethanol and 0.018 g of ferrous sulfate are charged and 27.2 g of a 30% hydrogen peroxide solution are then added. In a short time, the temperature rises to 80°–90° C. An approximately 28% polymer solution is obtained which is free of the odor of sulfur compounds. Its viscosity is about 100 mPa/s.

The weight average of the molecular weight is 2,180, the number average, 1,310, and the nonuniformity is 0.66.

The polymer is highly effective as a pigment dispersant in aqueous coating systems.

EXAMPLE 8

By the procedure of Example 1, 555 g of water, 277.5 g of methacrylic acid, 97.5 g of acrylic acid, 33.3 g of mercaptoethanol, 0.018 g of ferrous sulfate and 40.7 g of a 30% hydrogen peroxide solution are reacted. A clear 40% polymer solution which has a weakly acidulous odor is obtained. Its viscosity is about 400 mPa/s. The weight average of the molecular weight is 2,940, the number average, 1,600, and the nonuniformity is 0.84. The polymer possesses good effectiveness as a pigment dispersant.

EXAMPLES 9 TO 18

These examples describe the copolymers of methacrylic or acrylic acid with esters, hydroxy esters, amides, and nitriles of acrylic or methacrylic acid. The same procedure is used as in Example 1.

The composition of the monomer mixtures and the amounts of mercaptoethanol and hydrogen peroxide used are given in Table 2 along with the molecular weights obtained. All polymer solutions are free of the odor of sulfur compounds. The polymers of Examples, 9, 10, 11, 15, 16 and 17 have a particularly high calcium-binding capacity of over 1,000 mg $CaCO_3/g$ of solid substance used. By comparison, pure poly-acrylic acid of comparable molecular weight has a calcium-binding capacity of only about 500 mg $CaCO_3/g$ solid substance.

The calcium-binding capacity is determioned as follows:

1 g of polymer solid substance is dissolved in 100 ml of water and the solution is mixed with 10 ml of a 2% soda solution. The solution is adjusted with caustic soda solution to pH 9 and at that value titrated with a 4.41% aqueous solution of calcium acetate to constant turbidity. The calcium-binding capacity per gram of polymer is obtained from the titration amount, in milliliters, by multiplication with the factor 25.

TABLE 2

| Example | Water (g) | Monomers | Mercapto-ethanol (g) | Hydrogen peroxide solution, (30%) (g) | Ferrous sulfate (g) | Solids content (%) | $M_w$ | $M_n$ | NU | Calcium-binding capacity (mg $CaCO_3$/g solid substance) |
|---|---|---|---|---|---|---|---|---|---|---|
| 9 | 600 | First stage: 170 g acrylic acid, 30 g ethyl acrylate | 12.0 | 20 | 0.02 | 40 | $3.4 \cdot 10^3$ | $1.73 \cdot 10^3$ | 0.96 | 1,830 |
|  | — | Second stage: 170 g acrylic acid, 30 g ethyl acrylate |  |  | — |  |  |  |  |  |
| 10 | 563 | First stage: 163.5 g acrylic acid, 24.1 g methyl acrylate | 7.5 | 18.7 | 0.018 | 40 | $3.6 \cdot 10^3$ |  | 0.58 | 1,034 |
|  | — | Second stage: 163.5 g acrylic acid, 24.1 g methyl acrylate | 7.5 | 18.7 | — |  |  |  |  |  |
| 11 | 600 | 160 g acrylic acid, 40 g methyl acrylate | 12.0 | 20.0 | 0.02 | 28 | $2.36 \cdot 10^3$ |  | 0.69 | 2,800 |
| 12 | 563 | First stage: 167.6 g acrylic acid, 20.0 g acrylamide | 7.5 | 18.7 | 0.018 | 43 | $3.39 \cdot 10^3$ |  | 0.91 | 550 |
|  | — | Second stage: 167.6 g acrylic acid, 20.0 g acrylamide | 7.5 | 18.7 | — |  |  |  |  |  |
| 13 | 563 | First stage: 163.4 g acrylic acid, 24.2 g methacrylamide | 7.5 | 18.7 | 0.018 | 42 | $3.06 \cdot 10^2$ |  | 0.80 | 640 |
|  | — | Second stage: 163.4 g acrylic acid, 24.2 g methacrylamide | 7.5 | 18.7 | — |  |  |  |  |  |
| 14 | 600 | 196.0 g acrylic acid, 4.0 g n-butyl acrylate | 12.0 | 20.0 | 0.01 |  | $2.18 \cdot 10^3$ | $1.35 \cdot 10^3$ | 0.62 | 611 |
| 15 | 600 | 160.0 g acrylic acid, 40.0 g acrylonitrile | 12.0 | 20.0 | 0.02 | 27 | $2.41 \cdot 10^3$ |  | 0.44 | 2,280 |
| 16 | 540 | 108.0 g acrylic acid, 72.0 g 2-hydroxy-ethyl acrylate | 13.5 | 18.5 | 0.018 | 26 | $2.3 \cdot 10^3$ |  | 0.86 | 2,800 |
| 17 | 540 | 162.0 g acrylic acid, 18.0 g 2-hydroxy-ethyl acrylate | 13.5 | 18.5 | 0.018 | 26 | $1.47 \cdot 10^3$ |  | 0.54 | 1,350 |
| 18 | 540 | 162.0 g methacrylic acid, 18.0 g 2-hydroxy ethyl acrylate | 13.5 | 18.5 | 0.018 | 27 | $1.92 \cdot 10^3$ | $1.26 \cdot 10^3$ | 0.52 | 502 |

EXAMPLES 19 TO 22

These examples demonstrate that molecular-weight control is not affeced by the hydrogen peroxide concentration.

The procedure is the same as in Example 1.

TABLE 3

| Example | Water (g) | Acrylic acid First stage (g) | Acrylic acid Second stage (g) | Mercapto-ethanol per stage (g) | Hydrogen peroxide solution (30%) First stage (g) | Hydrogen peroxide solution (30%) Second stage (g) | Ferrous sulfate (g) | Solids content (g) | $M_w$ |
|---|---|---|---|---|---|---|---|---|---|
| 19 | 300 | 100 | 100 | 2.0 | 5 | 5 | 0.01 | 40 | $1.35 \cdot 10^4$ |
| 20 | 300 | 100 | 100 | 2.0 | 10 | 10 | 0.01 | 40 | $1.4 \cdot 10^4$ |
| 21 | 300 | 100 | 100 | 2.0 | 20 | 20 | 0.01 | 40 | $1.3 \cdot 10^4$ |

TABLE 3-continued

| Example | Water (g) | Acrylic acid First stage (g) | Acrylic acid Second stage (g) | Mercapto-ethanol per stage (g) | Hydrogen peroxide solution (30%) First stage (g) | Hydrogen peroxide solution (30%) Second stage (g) | Ferrous sulfate (g) | Solids content (g) | $M_w$ |
|---|---|---|---|---|---|---|---|---|---|
| 22 | 300 | 100 | 100 | 2.0 | 30 | 30 | 0.01 | 40 | $1.35 \cdot 10^4$ |

EXAMPLE 23

The same procedure is followed as in Example 1, except that in place of mercaptoethanol an equivalent amount of thioglycolic acid is used. The polymer here obtained is of substantially higher molecular weight than in Example 1 and has a broader molecular-weight distribution. ($M_w$=334,000, NU=13.05.)

We claim:

1. A method for making a clear viscous aqueous solution of a water soluble polymer or copolymer of acrylic acid or of methacrylic acid having a molecular weight between 800 and 100,000, which method comprises polymerizing from 50 to 100 mol percent of a monomer selected from the group consisting of acrylic acid and methacrylic acid and from 0 to 50 mol percent of one or more other monomers copolymerizable therewith and selected from the group consisting of alkyl esters of acrylic acid and of methacrylic acid, acrylonitrile, methacrylonitrile, and hydroxyalkyl esters of acrylic acid and of methacrylic acid having 2 to 4 carbon atoms in the hydroxyalkyl group, said percentages being based on the total moles of polymerizable monomers present, in an aqueous solution in the presence of an initiator which is a mixture of 10 to 100 parts per million of iron ion, 0.5 to 10 percent of hydrogen peroxide, and from 0.5 to 20 percent of a water soluble mercaptan, said parts and percentages being by weight of the monomers.

2. A method as in claim 1 wherein said polymer or copolymer has the formula

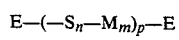

E—(—$S_n$—$M_m$)$_p$—E wherein

E is a terminal group which is —H, —RS, —OS—R, or —OH,

R is a moiety of said water soluble mercaptan,

S is a polymerized unit of acrylic acid or of methacrylic acid or of a monovalent salt thereof, M is a polymerized unit of at least one comonomer copolymerizable with acrylic acid or methacrylic acid, p is the average total number of the units S and M, n is the percentage of units S in base mol percent, m is the percentage of units M in base mol percent, p has a minumum value of 10, n has a value from 50 to 100 percent, m has a value from 0 to 50 percent, and S and M may occur in any order in the structure of the polymer or copolymer.

3. A method as in claim 1 wherein other monomers copolymerizable with acrylic acid and methacrylic acid are selected from the group consisting of lower alkyl esters of acrylic acid and of methacrylic acid.

4. A method as in claim 1 wherein said water soluble mercaptan is mercaptoethanol.

5. A method as in claim 1 wherein the clear viscous polymer solution obtained is dried by spray drying to form a solid powdered polymer product.

6. A method as in claim 1 wherein the clear viscous polymer solution obtained is dried by drum drying to form a solid powdered polymer product.

7. A method for binding calcium ions in an aqueous system containing the same, which method comprises adding to said system a water soluble polymer or copolymer made by the method of claim 1.

8. A method as in claim 7 wherein said water soluble copolymer comprises from 60 to 90 mol percent of acrylic acid and from 40 to 60 mol percent of ethyl acrylate.

9. A method for dispersing minerals or pigments in a high-solids aqueous system which comprises adding to said system a dispersing amount of a polymer or copolymer made by the method of claim 1.

* * * * *